(12) United States Patent
Morimoto et al.

(10) Patent No.: US 12,534,088 B2
(45) Date of Patent: Jan. 27, 2026

(54) DISTRACTION JUDGMENT DEVICE, DISTRACTION JUDGMENT METHOD, AND NONTRANSITORY COMPUTER STORAGE MEDIUM

(71) Applicants: TOYOTA JIDOSHA KABUSHIKI KAISHA, Toyota (JP); DENSO CORPORATION, Kariya (JP)

(72) Inventors: Hiroshi Morimoto, Tokyo-to (JP); Kenta Yamada, Tokyo-to (JP); Jiro Fujino, Toyota (JP); Kenichiroh Hara, Yokohama (JP); Satoru Kawakami, Tokyo-to (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 132 days.

(21) Appl. No.: 18/632,764

(22) Filed: Apr. 11, 2024

(65) Prior Publication Data
US 2024/0375665 A1 Nov. 14, 2024

(30) Foreign Application Priority Data
May 9, 2023 (JP) .................................. 2023-077338

(51) Int. Cl.
*B60W 40/08* (2012.01)
*B60W 50/14* (2020.01)
(Continued)

(52) U.S. Cl.
CPC ............ *B60W 40/08* (2013.01); *B60W 50/14* (2013.01); *G06V 20/597* (2022.01); *G06V 40/18* (2022.01);
(Continued)

(58) Field of Classification Search
CPC ................ B60W 40/08; B60W 50/14; B60W 2540/225; B60W 2540/229;
(Continued)

(56) References Cited

U.S. PATENT DOCUMENTS

| 8,742,952 B1 * | 6/2014 | Bold ......................... G08G 5/21 340/436 |
| 2017/0069212 A1 * | 3/2017 | Miyazawa ................ G08G 1/16 |

(Continued)

FOREIGN PATENT DOCUMENTS

| JP | 2018-147232 A | 9/2018 |
| JP | 2019-087143 A | 6/2019 |

*Primary Examiner* — Naomi J Small
(74) *Attorney, Agent, or Firm* — Oliff PLC

(57) ABSTRACT

A distraction judgment device detecting an object present in a front direction of a vehicle based on surrounding data showing a situation around that vehicle, detecting a gaze origin and gaze direction of the driver based on driver data showing a state of the driver, changing an up-down direction viewing judgment range for judging whether the driver is looking at inside equipment arranged inside at the front in accordance with a positional relationship with the object, judging that the driver is being distracted by the inside equipment if the gaze direction of the driver falls within the viewing judgment range continuously for greater than or equal to a predetermined distraction judgment time, and changing the viewing judgment range so that the top end position of the viewing judgment range becomes lower when the object is positioned close by compared to when it is positioned far away.

15 Claims, 9 Drawing Sheets

(51) Int. Cl.
*G06V 20/59* (2022.01)
*G06V 40/18* (2022.01)

(52) U.S. Cl.
CPC ............... *B60W 2040/0818* (2013.01); *B60W 2050/143* (2013.01); *B60W 2050/146* (2013.01); *B60W 2420/403* (2013.01); *B60W 2540/225* (2020.02); *B60W 2540/229* (2020.02); *B60W 2554/80* (2020.02)

(58) Field of Classification Search
CPC ..... B60W 2554/80; B60W 2040/0818; B60W 2050/143; B60W 2050/146; B60W 2420/403; G06V 20/597; G06V 40/18
USPC ......................................................... 340/576
See application file for complete search history.

(56) References Cited

U.S. PATENT DOCUMENTS

2019/0135295 A1    5/2019  Sato et al.
2019/0300003 A1*  10/2019  Shiraishi ................ G07C 5/008

* cited by examiner

DISTRACTION JUDGMENT DEVICE, DISTRACTION JUDGMENT METHOD, AND NONTRANSITORY COMPUTER STORAGE MEDIUM

FIELD

The present invention relates to a distraction judgment device, distraction judgment method, and nontransitory computer storage medium.

BACKGROUND

Japanese Unexamined Patent Publication No. 2019-87143 discloses a conventional driver monitoring device which is configured to enlarge an allowable left and right direction range of a gaze of a driver the shorter a distance to a preceding vehicle running in another lane (adjacent lane) and to judge that the driver is distracted if the gaze of the driver departs from that range.

SUMMARY

At a front top side of a driver's seat and a front passenger seat of a vehicle, front glass is arranged. At the front bottom side, a dashboard is arranged. At the dashboard, a monitor and car navigation system, meters, and other equipment viewed by the driver (below, referred to as "inside equipment") are attached. For this reason, when a driver is looking at inside equipment (that is, when distracted), compared to when the driver is looking through the front glass at another vehicle or other object outside in the front direction (below, referred to as an "outside front object"), the gaze direction of the driver turns downward in the up/down direction (vehicle height direction).

Further, in the same way as this, if the driver is looking through the front glass at an outside front object, when that outside front object is present close by to the host vehicle, compared to when it is present far away from it, the gaze direction of the driver tends to turn downward in the up/down direction.

For this reason, when an outside front object is close to the host vehicle, compared to when it is far away from it, it is difficult to judge whether the driver is viewing the outside front object through the front glass or is viewing the inside equipment. If, like in the conventional driver monitoring device explained above, changing the allowable left-right direction range of gaze of the driver in accordance with the positional relationship with a preceding vehicle running in another lane (adjacent lane), when the driver is viewing the outside front object through the front glass, the gaze direction turns downward in the up/down direction since the distance to the outside front object gradually becomes smaller, so it is liable to end up being mistakenly judged that inside equipment is being viewed despite an outside front object being viewed.

The present invention was made focusing on such a problem and has as its object to keep it from being mistakenly judged that inside equipment is being viewed despite an outside front object being viewed.

The gist of the present disclosure is as follows:

(1) A distraction judgment device configured to judge distraction of a driver of a vehicle, wherein the distraction judgment device is further configured to: detect an object present in a front direction of the vehicle based on surrounding data showing a situation around the vehicle; detect a gaze origin and gaze direction of the driver based on driver data showing a state of the driver; change an up-down direction viewing judgment range for judging whether the driver is looking at inside equipment arranged inside at the front in accordance with a positional relationship with the object; judge that the driver is distracted by the inside equipment if the gaze direction of the driver falls within the viewing judgment range continuously for greater than or equal to a predetermined distraction judgment time; and change the viewing judgment range so that the top end position of the viewing judgment range becomes lower when the object is positioned close by compared to when it is positioned far away.

(2) The distraction judgment device according to the above (1), wherein the top end position of the viewing judgment range is set to any position from a top end position of the inside equipment to a bottom end position of front glass of the vehicle when the object is positioned far away.

(3) The distraction judgment device according to the above (1) or the above (2), wherein the distraction judgment device is further configured not to change the viewing judgment range when a positional relationship with the object shifts from a state where it is positioned far away to a state where it is positioned close by in a period from when the gaze direction of the driver falls within the viewing judgment range to when the distraction judgment time elapses.

(4) The distraction judgment device according to any one of the above (1) to the above (3), wherein the distraction judgment device is further configured to: obtain a grasp of the positional relationship with the object by detecting a distance to the object; judge that the object is positioned far away if the distance to the object is greater than or equal to a predetermined threshold value; and judge that the object is positioned close by if the distance to the object is less than the predetermined threshold value.

(5) The distraction judgment device according to any one of the above (1) to the above (3), wherein the distraction judgment device is further configured to: obtain a grasp of a positional relationship with the object by detecting a gaze angle of the driver, the gaze angle being an angular degree of an angle formed by a horizontal line extending horizontally from a gaze origin of the driver and a gaze direction line extending from the gaze origin of the driver toward the gaze direction lower than the horizontal line; judge that the object is positioned far away if that gaze angle is less than or equal to a predetermined angle; and judge that the object is positioned close by if that gaze angle is greater than the predetermined angle.

(6) The distraction judgment device according to any one of the above (1) to the above (5), wherein the distraction judgment device is further configured to make the distraction judgment time larger when the object is positioned close by compared to when it is positioned far away.

(7) The distraction judgment device according to any one of the above (1) to the above (6), wherein the distraction judgment device is further configured to issue a warning to the driver regarding distraction when judging that the driver is distracted by inside equipment.

(8) A distraction judgment device configured to judge distraction of a driver of a vehicle, wherein the distraction judgment device is further configured to: detect an object present in a front direction of the vehicle based on surrounding data showing a situation around the vehicle; detect a gaze origin, gaze direction, and gaze angle of the driver based on driver data showing a state of the driver; change a distraction judgment angle for judging whether the driver is looking at inside equipment arranged inside at the front in accordance with a positional relationship with the object;

judge that the driver is distracted by the inside equipment if a gaze angle of the driver becomes greater than or equal to the distraction judgment angle continuously for greater than or equal to a predetermined distraction judgment time; and make the distraction judgment angle larger when the object is positioned close by compared to when it is positioned far away, and the gaze angle is an angular degree of an angle formed by a horizontal line extending horizontally from a gaze origin of the driver and a gaze direction line extending from the gaze origin of the driver toward the gaze direction lower than the horizontal line, and the distraction judgment angle is an angular degree of the angle formed by the horizontal line and the distraction judgment line extending from the gaze origin of the driver toward the top end position of the inside equipment.

(9) A distraction judgment method by a distraction judgment device configured to judge distraction of a driver of a vehicle, wherein the distraction judgment method comprises: detecting an object present in a front direction of the vehicle based on surrounding data showing a situation around the vehicle; detecting a gaze origin and gaze direction of the driver based on driver data showing a state of the driver; changing an up-down direction viewing judgment range for judging whether the driver is looking at inside equipment arranged inside at the front in accordance with a positional relationship with the object; judging that the driver is being distracted by inside equipment if the gaze direction of the driver falls within the viewing judgment range continuously for greater than or equal to a predetermined distraction judgment time; and changing the viewing judgment range so that the top end position of the viewing judgment range becomes lower when the object is positioned close by compared to when it is positioned far away.

(10) A nontransitory computer storage medium containing a computer program for a distraction judgment device configured to judge distraction of a driver of a vehicle, the nontransitory computer storage medium containing a computer program for making the distraction judgment device: detect an object present in a front direction of the vehicle based on surrounding data showing a situation around that vehicle; detect a gaze origin and gaze direction of the driver based on driver data showing a state of the driver; change an up-down direction viewing judgment range for judging whether the driver is looking at inside equipment arranged inside at the front in accordance with a positional relationship with the object; judge that the driver is being distracted by inside equipment if the gaze direction of the driver falls within the viewing judgment range continuously for greater than or equal to a predetermined distraction judgment time; and change the viewing judgment range so that the top end position of the viewing judgment range becomes lower when the object is positioned close by compared to when it is positioned far away.

According to these aspects of the present invention, the top end position of the up/down direction viewing judgment range for judging whether inside equipment is being viewed is changed downward when an outside front object is positioned close by compared to when it is positioned far away, so it is possible to keep it from being mistakenly judged that inside equipment is being viewed despite an outside front object being viewed.

DESCRIPTION OF EMBODIMENTS

Below, embodiments of the present invention will be explained in detail with reference to the drawings. Note that in the following explanation, similar component elements will be assigned the same reference notations.

First Embodiment

Figure 1:
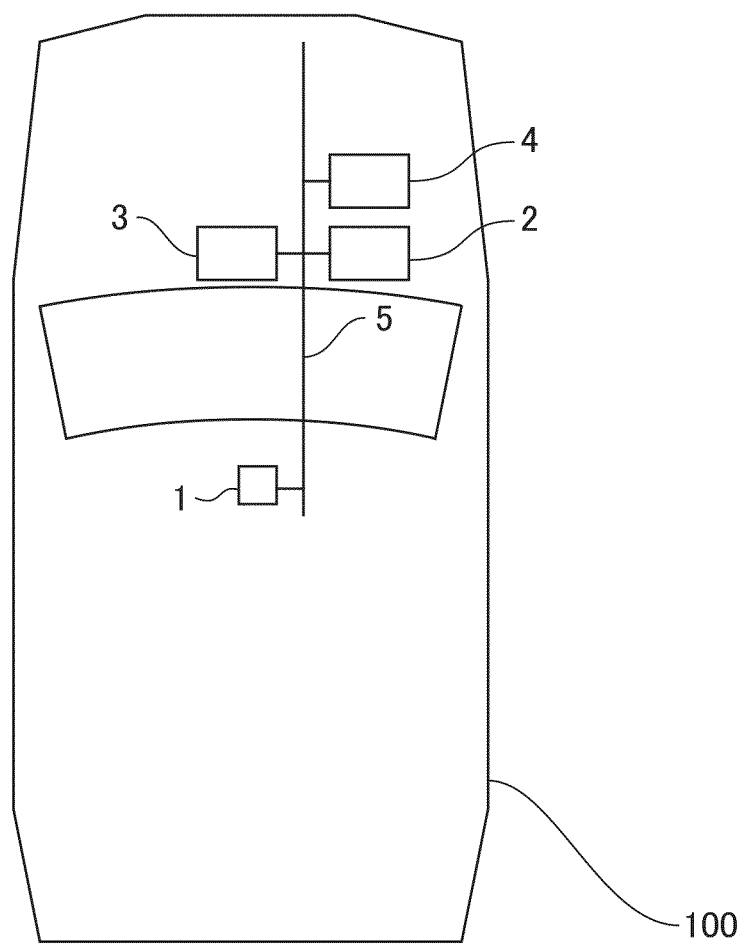
FIG. 1 is a schematic view of a system configuration of a vehicle according to a first embodiment of the present invention.

FIG. 1 is a schematic view of a system configuration of a vehicle 100 according to a first embodiment of the present invention.

The vehicle 100 is provided with a surrounding sensor 1, driver sensor 2, output device 3, and control device 4. The surrounding sensor 1, driver sensor 2, output device 3, and control device 4 are connected to be able to communicate through an internal vehicle network 5 based on the Controller Area Network standard. The vehicle 100 may be a vehicle equipped with an automated driving function or driver's assistance function or may be a manually driven vehicle.

The surrounding sensor 1 is a sensor for generating surrounding data showing the situation around the vehicle 100. In the present embodiment, as the surrounding sensor 1, one or more external cameras for capturing the surroundings of the vehicle 100 are provided. An external camera captures the surroundings of the vehicle 10 by a predetermined frame rate (for example, 10 Hz to 40 Hz) and generates surrounding images in which the surroundings of the vehicle 100 are reflected. The external camera sends the generated surrounding images as surrounding data to the control device 4 each time generating surrounding images.

Note that instead of an external camera or in addition to an external camera, it is also possible to provide as a surrounding sensor 1 a distance measurement sensor for measuring the distance up to another vehicle or pedestrian, bicycle, or other object present around the vehicle 100. As an example of a distance measurement sensor, for example, a lidar (light detection and ranging device) for emitting laser light and measuring distance based on its reflected light, a millimeter wave radar sensor for emitting an electromagnetic wave and measuring distance based on its reflected wave, etc. may be mentioned.

The driver sensor 2 is a sensor for generating driver data showing the state of a driver. In the present embodiment, as the driver sensor 2, a driver monitor camera is provided for capturing the appearance of the driver, including the face of the driver. The driver monitor camera captures the appearance of the driver by a predetermined frame rate (for example, 10 Hz to 40 Hz) and generates external images in which the appearance of the driver is reflected. The driver monitor camera sends the generated external images as driver data to the control device 4 each time generating external images of the driver.

The output device 3 is a device for notifying information to a driver through physical senses of the driver of the vehicle 100 (for example, sight, hearing, touch, etc.) In the present embodiment, as the output device 3, a display arranged at a position which the driver can view (for example, instrumentation display, center display, heads up display, etc.) and a speaker are provided. The display displays information corresponding to a display signal output from the control device 4 (for example, text information or image information). The speaker outputs audio corresponding to an audio signal output from the control device 4.

The control device 4 is an ECU (electronic control unit) provided with a communication part 41, storage part 42, and processing part 43 (see FIG. 2) and is configured to at least be able to judge whether the driver of the vehicle 100 is distracted by the inside equipment (monitor or car navigation system attached to the dashboard, meters, and other equipment viewed by the driver) and, in accordance with the result of judgment, issue a warning to the driver. The control device 4 can receive, as input, in addition to the above-mentioned surrounding data and driver data, in accordance with need, for example, vehicle position data acquired by a position measuring sensor, vehicle speed data acquired by a vehicle speed sensor, or other various types of data.

Figure 2:
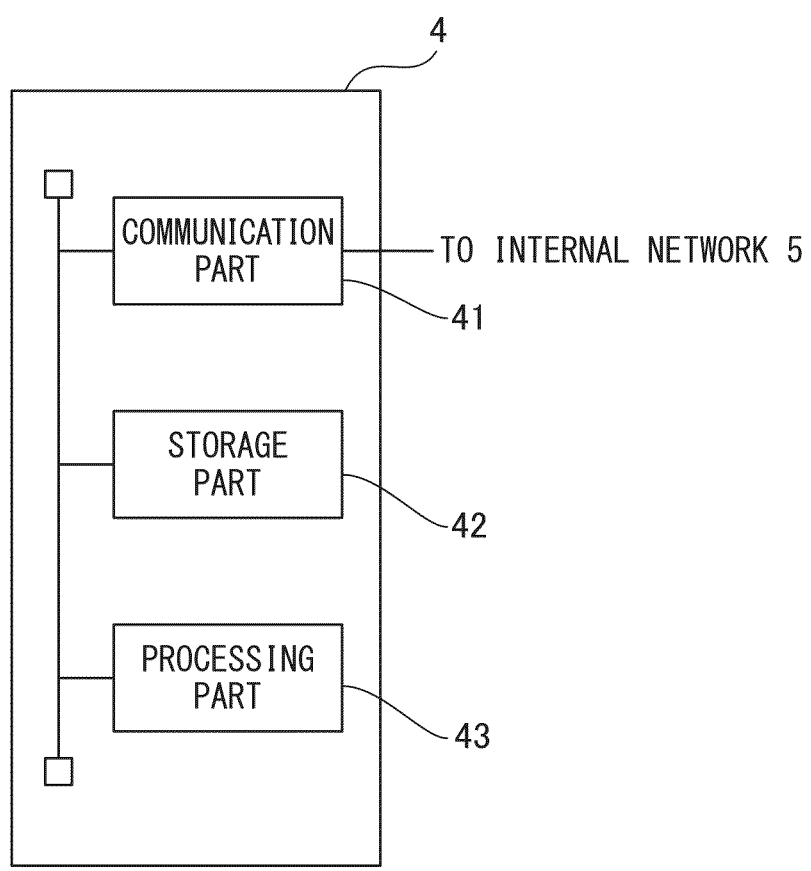
FIG. 2 is a view showing a hardware configuration of a control device.

FIG. 2 is a view showing the hardware configuration of the control device 4.

The control device 4 is provided with a communication part 41, storage part 42, and processing part 43.

The communication part 41 is provided with an interface circuit for connecting the control device 4 to an internal vehicle network 5. The communication part 41 supplies the data received from the outside (surrounding data, driver data, etc.) to the processing part 43. Further, the communication part 41 sends the display signal and audio signal output from the processing part 43 to the output device 3.

The storage part 52 has a HDD (hard disk drive) or SSD (solid state drive) or semiconductor memory or other storage medium and stores various computer programs and data etc. used for processing at the processing part 43.

The processing part 43 has one or more CPUs (central processing units) and their peripheral circuits and runs various computer programs stored in the storage part 42, for example, is a processor. Below, referring to FIG. 3, one example of the processing part 43 and in turn the processing for judging distraction by the inside equipment as one of the processing operations performed by the control device 4 will be explained.

Figure 3:
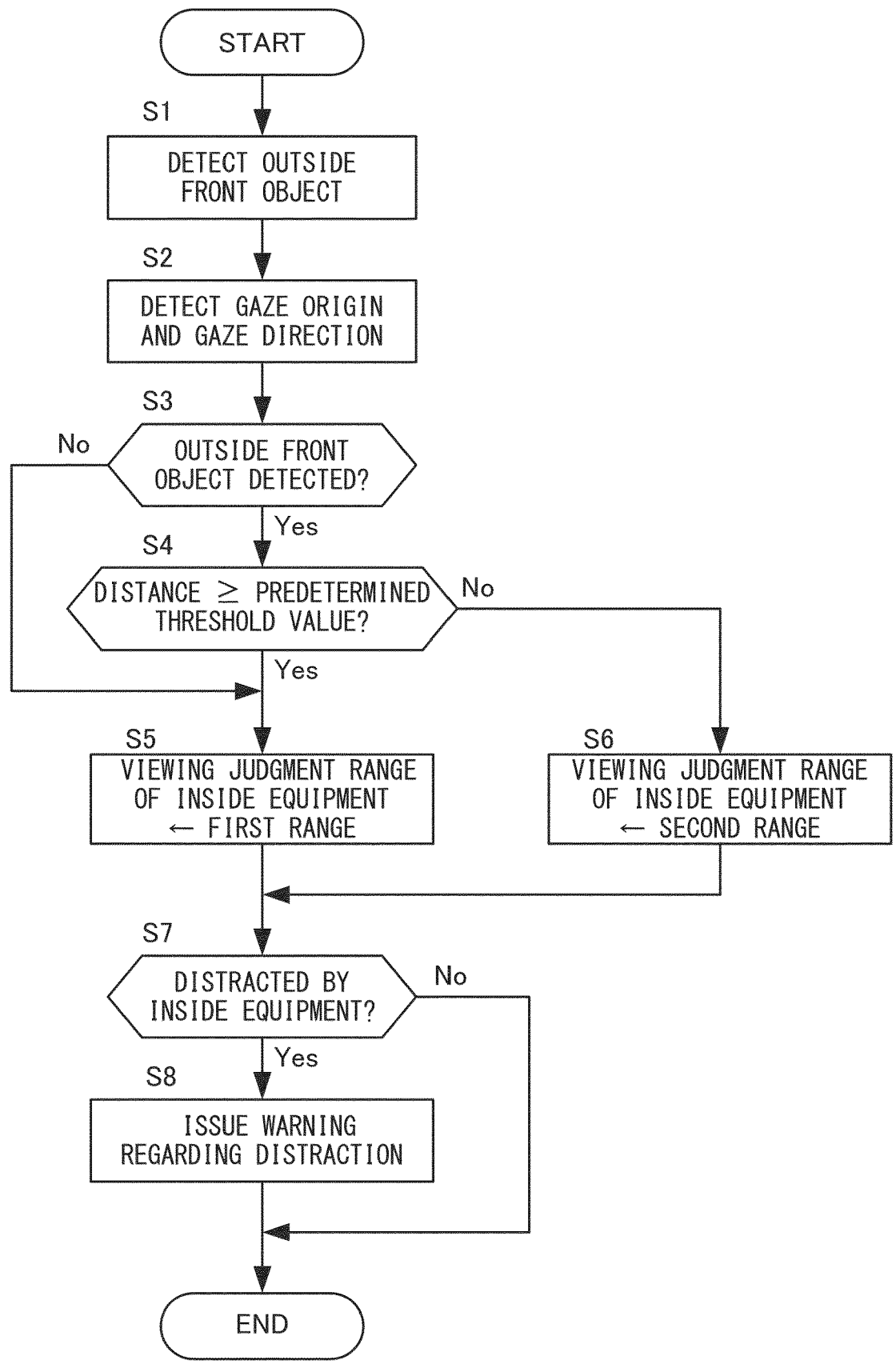
FIG. 3 is a flow chart for explaining details of processing for judging distraction by inside equipment according to the first embodiment of the present invention.

FIG. 3 is a flow chart for explaining details of the processing for judging distraction by inside equipment according to the present embodiment. The control device 4 repeatedly executes this routine at predetermined processing intervals.

At step S1, the control device 4 detects objects present in the front direction of the vehicle 100 (outside front objects) based on surrounding data received from the surrounding sensor 1, specifically the surrounding images received from an external camera.

In the present embodiment, the control device 4 successively inputs surrounding images received from the external camera into a classifier and detects the regions in which outside front objects are shown and the types of the outside front objects shown in those regions. The classifier, for example, can be made a convolutional neural network (CNN) having a plurality of convolution layers connected in series from the input side to the output side. Further, the control device 4 uses the standard sizes of the objects stored in the storage part 42 for each type of object and the size of an outside front object detected at the surrounding images to estimate the distance from the vehicle 100 to the outside front object (vehicle-to-vehicle distance) and follows (tracks) the outside front object detected at the surrounding images along a time series to calculate the position and speed of the outside front object. Note that the method of detection of the outside front object is not limited to such a method. Various known techniques may be used for detection.

At step S2, the control device 4 detects a gaze direction of the driver based on the driver data received from the driver sensor 2, specifically, the image of the appearance of the driver received from the driver monitor camera.

In the present embodiment, the control device 4 successively processes the facial images received from the driver monitor camera 21 to thereby detect the position of the center of a pupil forming the moving point (that is, the gaze origin of the driver) and the Purkinje image forming the reference point (corneal reflected image) and detects the gaze direction of the driver based on the positional relationship of the Purkinje image and center of the pupil (position of moving point with respect to reference point).

At step S3, the control device 4 judges if an outside front object has been detected. If an outside front object has been detected, the control device 4 proceeds to the processing of step S4. On the other hand, if an outside front object has not been detected, the control device 4 proceeds to the processing of S5.

At step S4, the control device 4 judges if the distance to the outside front object is greater than or equal to a predetermined threshold value. If the distance to the outside front object is greater than or equal to the predetermined threshold value, the control device 4 judges that the outside front object is present far away and proceeds to the processing of step S5. On the other hand, if the distance to the outside front object is less than the predetermined threshold value, the control device 4 judges that the outside front object is present close by and proceeds to the processing of step S6.

Figure 4:
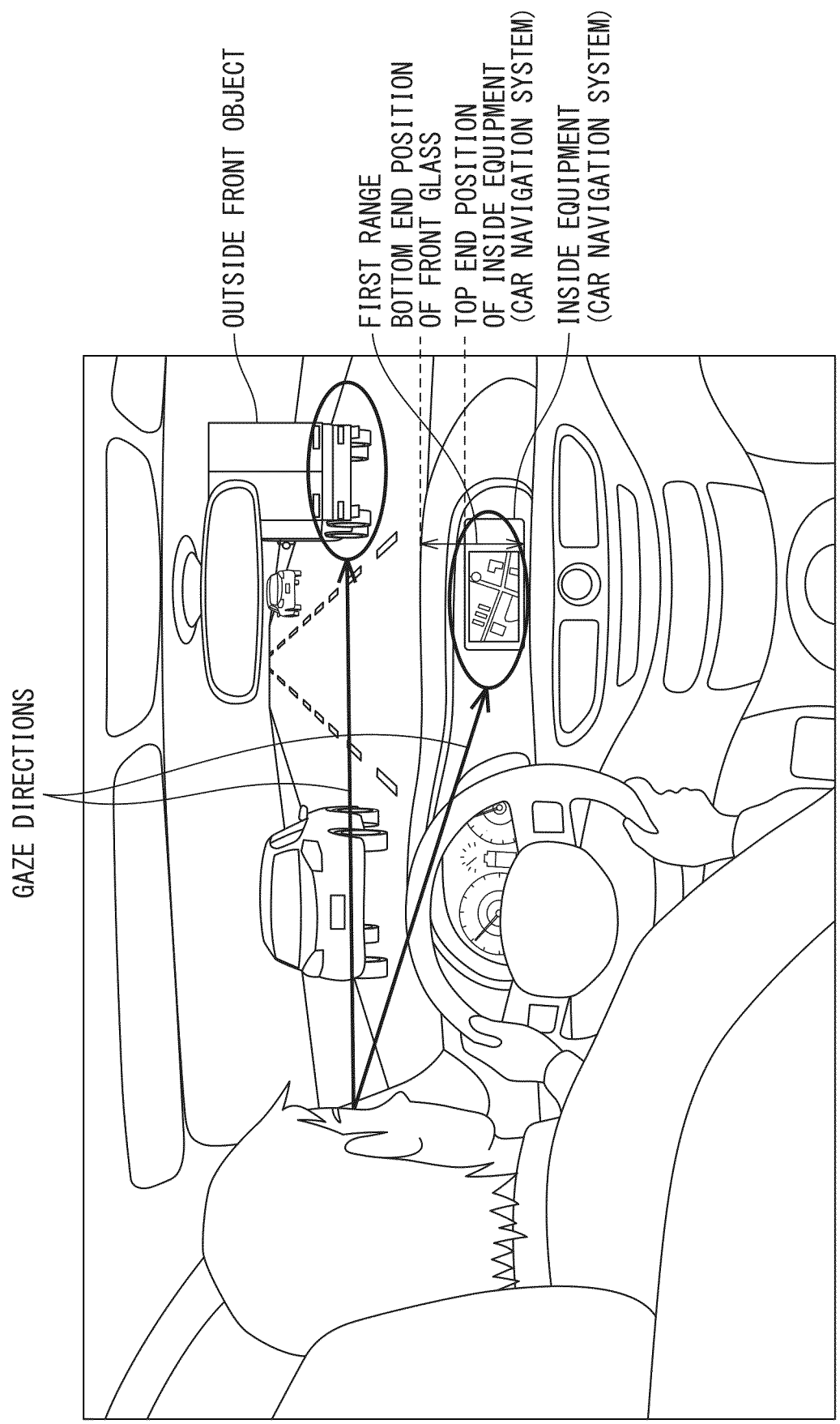
FIG. 4 is a view for explaining a viewing judgment range of inside equipment.

At step S5, the control device 4 sets the viewing judgment range of the inside equipment to a first range. The viewing judgment range of the inside equipment, as shown in FIG. 4, is a fixed range in the up-down direction for judging whether a driver is looking at inside equipment attached to the dashboard (in the example shown in FIG. 4, a car navigation monitor). The top end position of the first range is set to any position from the top end position of the inside equipment (in the example shown in FIG. 4, the top end position of the monitor of the car navigation system) to the bottom end position of the front glass (top end position of dashboard). The bottom end position of the first range can for example be made the bottom end position of the inside equipment (in the example shown in FIG. 4, the bottom end position of the monitor of the car navigation system), but below that position is also possible. Further, it may also be a certain extent above it.

At step S6, the control device 4 sets the viewing judgment range of the inside equipment to a second range different from the first range. The top end position of the second range is set below the top end position of the first range. Below, the reason for this will be explained.

As shown in FIG. 4, if the gaze direction of the driver faces a range above the bottom end position of the front glass, it can be judged that the driver is looking at another vehicle or other outside front object through the front glass. Therefore, conversely speaking, if the gaze direction of the driver turns to a range below the bottom end position of the front glass, it can be judged that there is a possibility of the driver not looking at an outside front object through the front glass but looking at inside equipment.

Here, as the method for detecting viewing of inside equipment with a good sensitivity, setting the upper limit position of the viewing judgment range of the inside equipment to as high a side as possible, for example, to the bottom end position of the front glass, may be mentioned. Due to this, it is possible to quickly detect viewing of inside equipment when the gaze direction of the driver faces below the bottom end position of the front glass.

Figure 5:
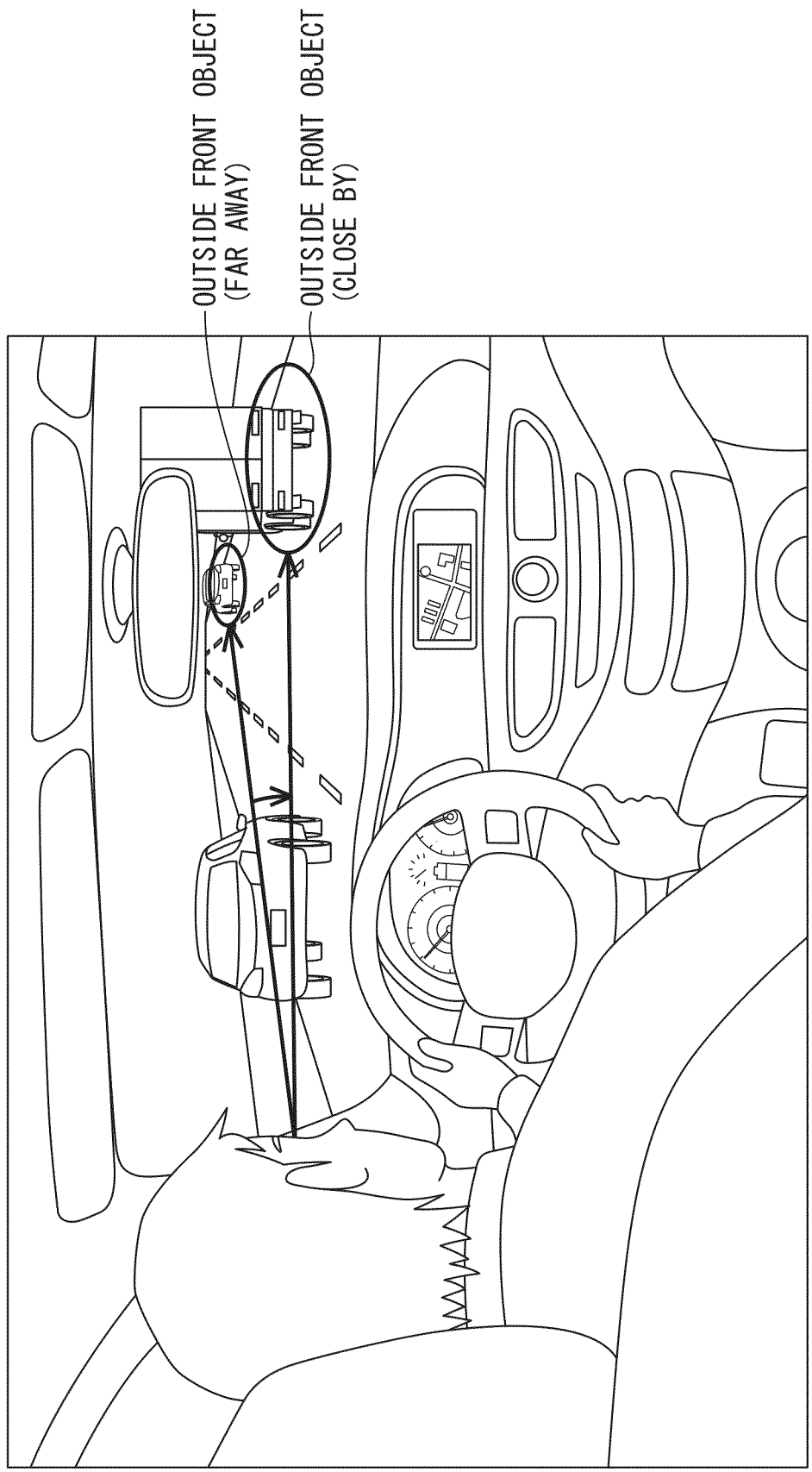
FIG. 5 is a view for explaining that a gaze direction of a driver tends to turn downward in the up/down direction when an outside front object is present close to a host vehicle compared to when it is present far away from it.

However, as shown in FIG. 5, if the driver is viewing an outside front object through the front glass, the gaze direction of the driver tends to face downward in the up-down direction (height direction) when the outside front object is present close to the host vehicle compared to when it is present far away.

For this reason, if setting the upper limit position of the viewing judgment range of the inside equipment to the top side to detect viewing of inside equipment with a good sensitivity, when the driver is looking at an outside front object through the front glass and the distance to the outside front object gradually becomes smaller, so the gaze direction turns downward, the gaze direction is liable to temporarily fall in the viewing judgment range of the inside equipment. As a result, it is liable to end up being judged that the driver is being distracted by inside equipment regardless of looking at an outside front object through the front glass.

Therefore, in the present embodiment, when the distance to an outside front object is less than a predetermined threshold value, that is, when it can be judged that the outside front object is present close by, the viewing judgment range of the inside equipment is made a second range with a top end position set below the first range. Due to this, even when the distance to the outside front object gradually becomes smaller and the gaze direction of the driver turns downward, it becomes harder for the gaze direction to fall within the viewing judgment range of the inside equipment, so it is possible to keep it from ending up being judged that the driver is distracted by inside equipment.

At step S7, the control device 4 judges whether the driver is being distracted by inside equipment, specifically whether the gaze direction of the driver falls within the viewing judgment range of the inside equipment continuously for greater than or equal to a predetermined distraction judgment time (for example, 2 seconds). If the gaze direction of the driver falls within the viewing judgment range of the inside equipment continuously for greater than or equal to the predetermined distraction judgment time, the control device 4 judges that the driver is not looking at an outside front object but is distracted and proceeds to the processing of step S8. On the other hand, if the gaze direction of the driver does not fall within the viewing judgment range of the inside equipment continuously for greater than or equal to the predetermined distraction judgment time, the control device 4 ends the current processing.

At step S8, the control device 4 issues a warning to the driver regarding distraction through the output device 3. The method and details of the warning regarding distraction are not particularly limited. For example, a warning may be issued by announcing by voice that an object outside in the front direction is not being recognized, a warning may be issued by emitting a warning sound, a warning may be issued by displaying graphic information or text information on a display, or a warning may be issued by a combination of the same.

According to the present embodiment explained above, the control device 4 (distraction judgment device) for judging distraction of the driver of the vehicle 100 is configured to detect an object present in a front direction of the vehicle 100 (outside front object) based on surrounding data showing the situation around the vehicle 100, detect a gaze origin and gaze direction of the driver based on driver data showing the state of the driver, change an up-down direction viewing judgment range for judging whether the driver is viewing inside equipment arranged inside at the front in accordance with a positional relationship with the outside front object, judge that the driver is distracted by the inside equipment if the gaze direction of the driver falls within the viewing judgment range continuously for greater than or equal to a predetermined distraction judgment time, and change the viewing judgment range so that the top end position of the viewing judgment range lower when the outside front object is positioned close by compared to when it is positioned far away.

Due to this, even when the distance to an outside front object gradually becomes smaller and the gaze direction of the driver turns downward, it becomes difficult for the gaze direction to fall in the viewing judgment range of inside equipment, so it is possible to keep it from being mistakenly judged that the driver is looking at inside equipment regardless of his looking at an outside front object.

Note that, in the present embodiment, the control device 4 obtains a grasp of the positional relationship with an outside front object by detecting the distance to the outside front object. It is configured so that if the distance to the outside front object is greater than or equal to a predetermined threshold value, it judges that the outside front object is positioned far away, while if the distance to the outside front object is less than the predetermined threshold value, it judges that the outside front object is positioned close by.

Due to this, it is possible to suitably change the top end position of the viewing judgment range in accordance with the distance to the outside front object.

Further, when the outside front object is positioned far away, the top end position of the viewing judgment range can for example be set to any position from the top end position of the inside equipment to the bottom end position of the front glass of the vehicle 100.

Due to this, when an outside front object is positioned far away, it is possible to detect viewing of inside equipment with a good sensitivity when the gaze direction of the driver faces further downward than the bottom end position of the front glass. Conversely speaking, when an outside front object is positioned close by, the top end position of the viewing judgment range is changed to be lower from when it is positioned far away, so it is possible to keep down the sensitivity of judgment of viewing inside equipment.

Second Embodiment

Next, a second embodiment of the present invention will be explained. The present embodiment differs from the first embodiment on the point of not changing the viewing judgment range to the second range, but maintaining it at the first range as is if an outside front object is present far away when the driver is already confirmed to be viewing inside equipment (being distracted) even if later that outside front object approaches and the distance becomes less than a predetermined threshold value. Below, this point of difference will be explained.

In the above-mentioned first embodiment, if an outside front object approaches when already viewing the outside front object through the front glass, the viewing judgment range of the inside equipment is changed from the first range to the second range and the sensitivity of judging viewing of the inside equipment is kept down, so it is possible to keep it end being judged that the driver is being distracted by inside equipment despite looking at an outside front object.

However, in the first embodiment, if not viewing an outside front object present far away through the front glass, but viewing inside equipment, when the outside front object rapidly approaches, the viewing judgment range of the inside equipment is liable to end up being set to the second range before a predetermined time has elapsed from when the driver starts being distracted by inside equipment. This being so, if the gaze direction of the driver falls in a region where it is included in the first range, but is not included in the second range, a warning regarding distraction cannot be issued to the driver.

Therefore, in the present embodiment, if the distance to an outside frontal vehicle becomes less than a predetermined distance in the period from when the driver starts being distracted by inside equipment to when a predetermined distraction judgment time elapses, the viewing judgment range of the inside equipment is not changed to the second range but is maintained at the first range as is. Due to this, when not viewing an outside front object present far away but viewing inside equipment, even if the outside front object rapidly approaches, the viewing judgment range of the inside equipment is not changed from the first range, so a warning regarding distraction can be issued to the driver.

Figure 6:
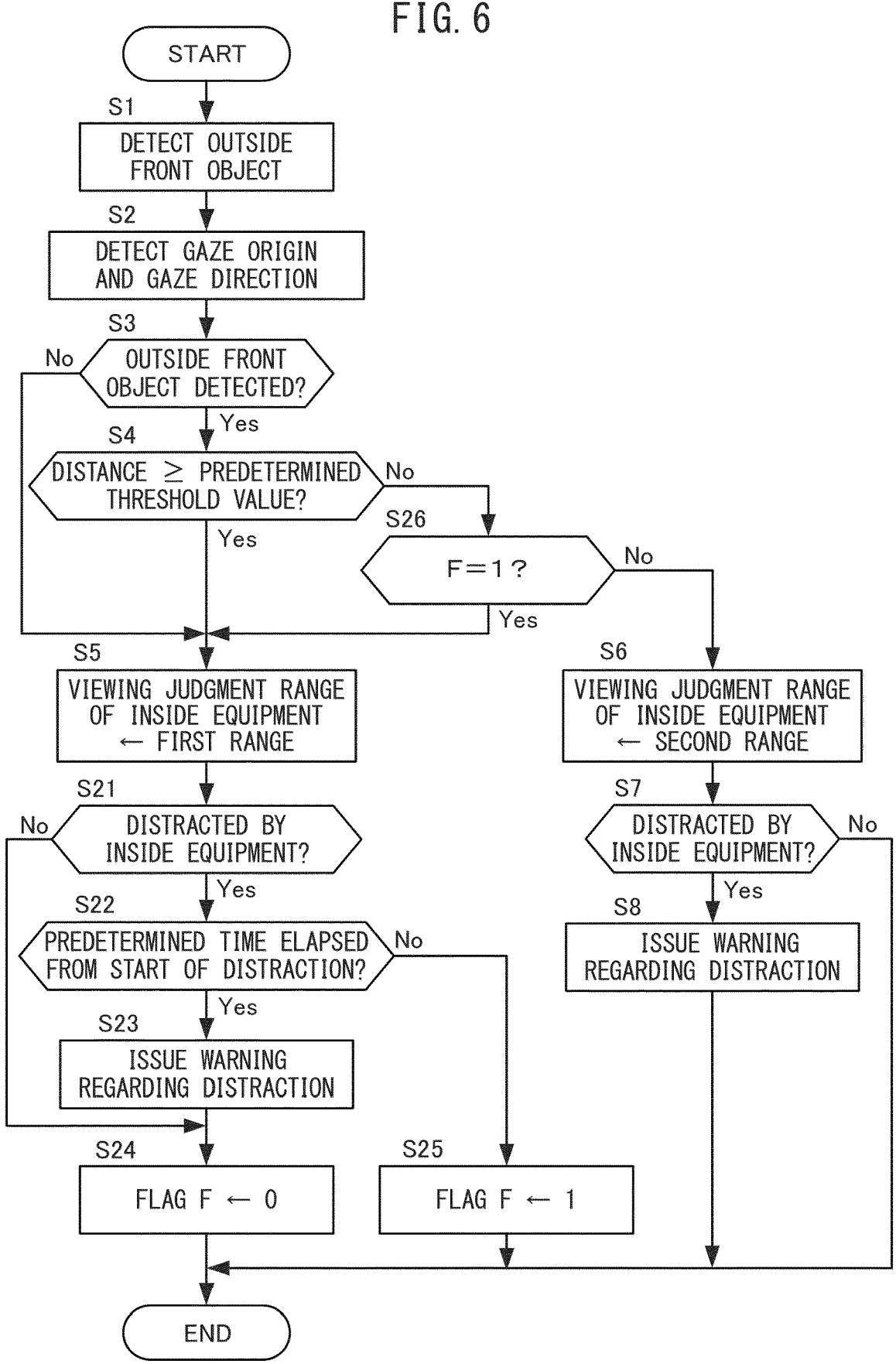
FIG. 6 is a flow chart for explaining details of processing for judging distraction by inside equipment according to a second embodiment of the present invention.

FIG. 6 is a flow chart for explaining details of the processing for judging distraction by inside equipment according to the present embodiment. The control device 4 repeatedly performs the present routine at predetermined processing intervals. Note that, in FIG. 6, the contents of the processing of steps S1 to S8 are similar to the first embodiment, so explanations will be omitted here.

At step S21, the control device 4 judges whether the driver is in the middle of being distracted by inside equipment. If the gaze direction of the driver falls within the viewing judgment range of the inside equipment, the control device 4 judges that the driver is in the middle of being distracted by inside equipment and proceeds to the processing of step S22. On the other hand, if the gaze direction of the driver does not fall within the viewing judgment range of the inside equipment, the control device 4 judges that the driver is not in the middle of being distracted by inside equipment and proceeds to the processing of step S24.

At step S22, the control device 4 judges whether the elapsed time from when the driver starts being distracted by inside equipment has become greater than or equal to a distraction judgment time. If the elapsed time from when the driver starts being distracted becomes greater than or equal to the distraction judgment time, the control device 4 proceeds to the processing of step S23 so as to warn the driver about being distracted by inside equipment. On the other hand, if the elapsed time from when the driver starts being distracted is less than the distraction judgment time, the control device 4 judges that it is still too early to issue a warning and proceeds to the processing of step S25.

At step S23, in the same way as the processing of step S8 of FIG. 3 explained above, the control device 4 issues a warning to the driver regarding distraction through the output device 3.

At step S24, the control device 4 sets a flag F to "0". The flag F is a flag which is set to "1" in a period from when the driver starts to be distracted by inside equipment to when the distraction judgment time elapses and is a flag which is initially set to "0".

At step S25, the control device 4 sets the flag F to "1".

At step S26, the control device 4 judges whether the flag F has been set to "1". When the flag F has been set to "1", that is, if not viewing an outside front object present far away through the front glass but being distracted by inside equipment, the control device 4 proceeds to the processing of step S5 and maintains the viewing judgment range of the inside equipment as the first range without changing it to the second range when the distance to that outside front object becomes less than a predetermined threshold value before the distraction judgment time elapses from the start of distraction by the inside equipment. On the other hand, if the flag F is set to "0", the control device 4 proceeds to the processing of step S6.

In this way, the control device 4 (distraction judgment device) according to the present embodiment is configured to not change the viewing judgment range when the positional relationship with an outside front object shifts from a state positioned far away to a state positioned close by in the period from when the gaze direction of the driver falls within the viewing judgment range to when a distraction judgment time elapses.

Due to this, it is possible to not change the viewing judgment range of inside equipment to the second range but maintain it at the first range if the distance to the outside front vehicle becomes less than a predetermined distance in the period from when starting to view the inside equipment to when a distraction judgment time elapses. For this reason, when not viewing an outside front object present far away but distracted by inside equipment, even if that outside front object rapidly approaches, the viewing judgment range of the inside equipment is not changed from the first range, so it is possible to detect viewing of inside equipment with a good sensitivity and issue a warning to the driver regarding distraction.

Third Embodiment

Next, a third embodiment of the present invention will be explained. The present embodiment differs from the first embodiment in the method of judgment of whether the driver is distracted by inside equipment. Below, this point of difference will be explained.

Figure 7A:
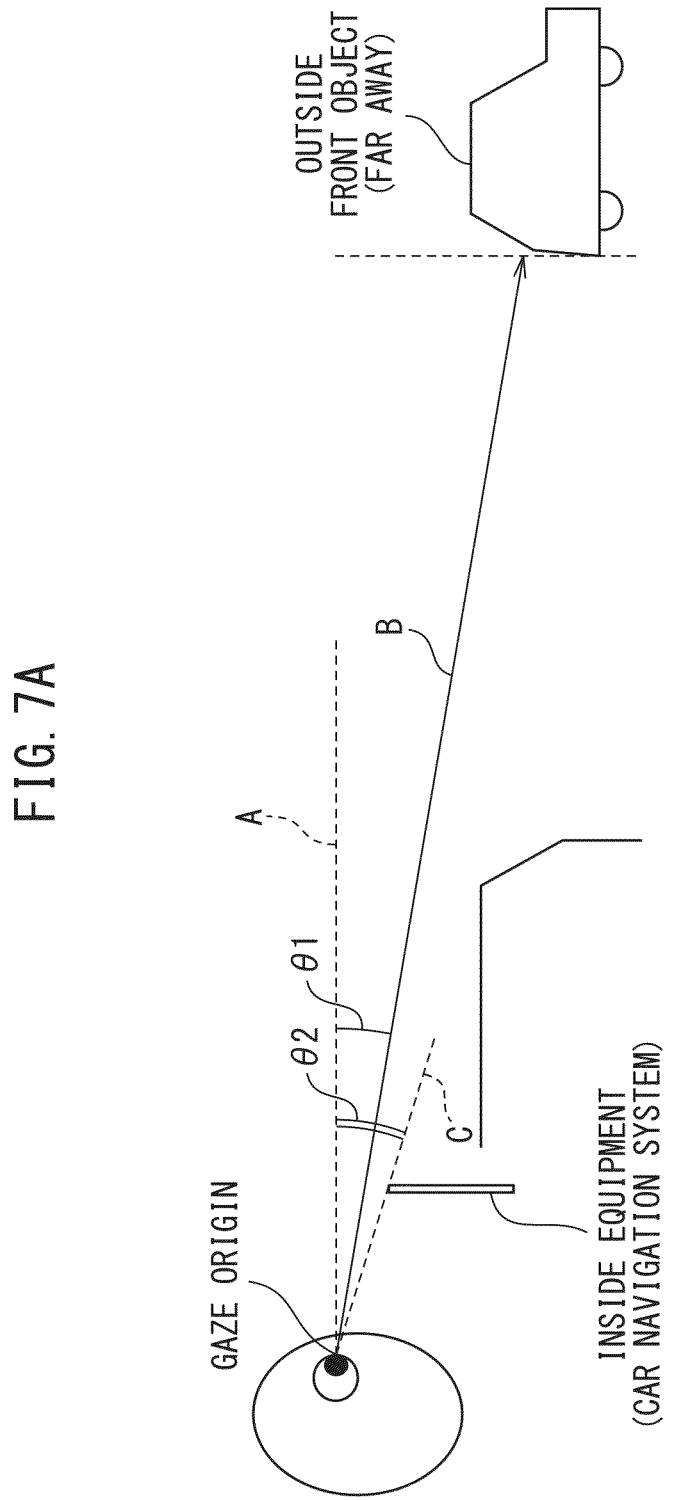
FIG. 7A is a view for explaining a gaze angle $\Theta 1$ and distraction judgment angle $\Theta 2$.
Figure 7B:
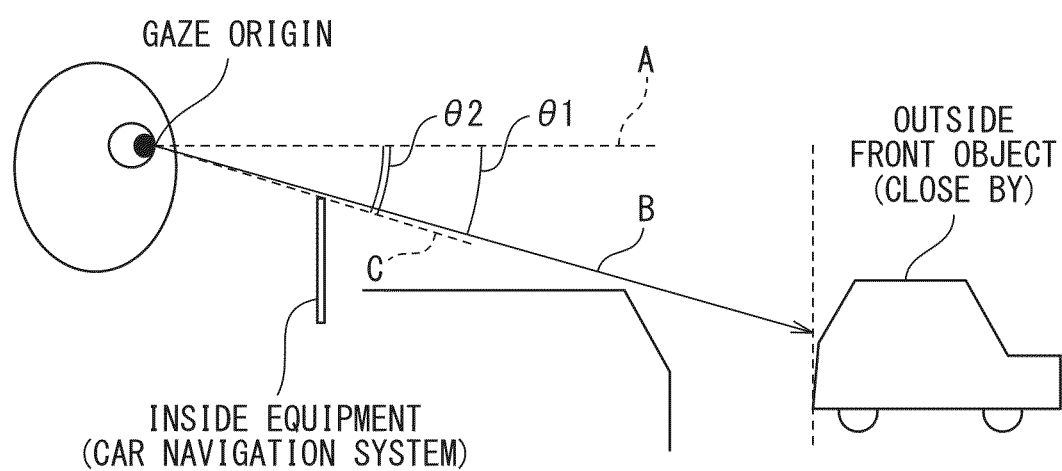
FIG. 7B is a view for explaining a gaze angle $\Theta 1$ and distraction judgment angle $\Theta 2$.

As shown in FIG. 7A and FIG. 7B, if defining the line extending horizontally from the gaze origin of the driver as the horizontal line A, the line extending from the gaze origin of the driver toward a gaze direction lower than the horizontal line as the gaze direction line B, the line extending from the gaze origin of the driver toward a top end position of the viewing judgment range of the inside equipment (in this example, the top end position of the car navigation monitor) as the distraction judgment line C, the angle formed by the horizontal line A and the gaze direction line B as the gaze angle $\Theta 1$, and the angle formed by the horizontal line A and the distraction judgment line C as the distraction judgment angle $\Theta 2$, it is possible to judge that the driver is distracted by inside equipment when the gaze angle $\Theta 1$ becomes greater than or equal to the distraction judgment angle Θ2. Note that FIG. 7A shows an example where the outside front object is present far away, while FIG. 7B shows an example where the outside front object is present close by.

Further, if the driver is looking at an outside front object, as shown in FIG. 7B, the gaze direction turns downward when the outside front object is present close by compared to when it is present far away as shown in FIG. 7A, so the gaze angle Θ1 tends to become larger. For this reason, when the outside front object is present close by, even if the driver had been looking at the outside front object, the difference in angle between the gaze angle Θ1 and the distraction judgment angle Θ2 tends to become smaller and it is liable to end up being mistakenly judged that the driver is distracted by inside equipment despite looking at an outside front object.

Therefore, in the present embodiment, the distraction judgment angle Θ2 is made larger when the outside front object is present close by compared to when it is present far away. Even if doing this, actions and effects similar to the first embodiment can be obtained.

Figure 8:
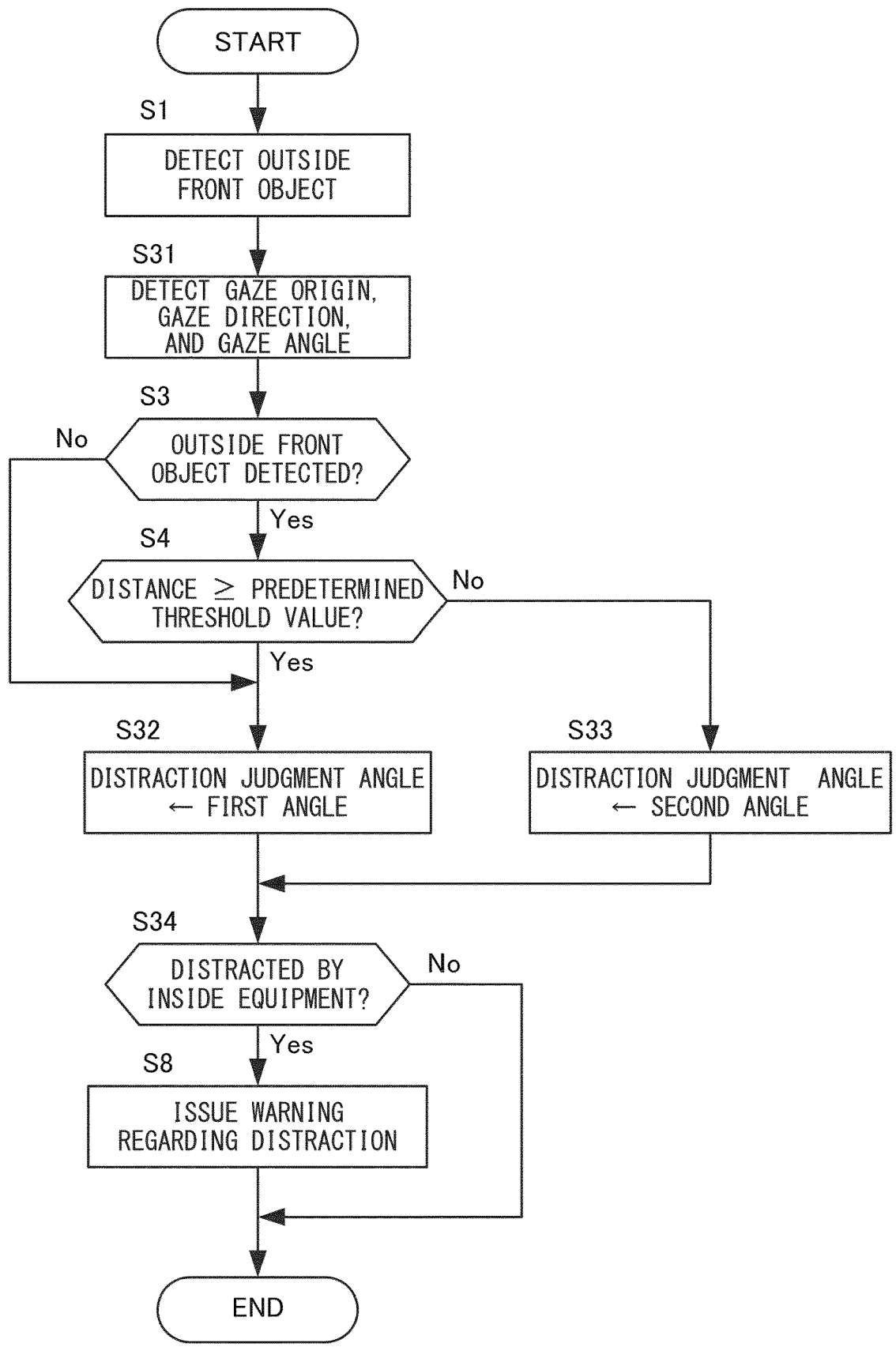
FIG. 8 is a flow chart for explaining details of processing for judging distraction by inside equipment according to a third embodiment of the present invention.

FIG. 8 is a flow chart for explaining details of processing for judging distraction by inside equipment according to the present embodiment. The control device 4 repeatedly performs the present routine at predetermined processing intervals. Note that, in FIG. 8, the contents of the processing of steps S1 to S4, S7, and S8 are similar to the first embodiment, so explanations will be omitted here.

At step S31, in the same way as the processing of step S2 of FIG. 3 explained above, the control device 4 detects a gaze origin and gaze direction of the driver and further detects a gaze angle Θ1.

At step S32, the control device 4 sets a distraction judgment angle Θ2 to a first angle. The first angle can, for example, be made ab angular degree of an angle formed by the distraction judgment line C and the horizontal line A when making the top end position of the viewing judgment range of inside equipment the top end position of the first range explained above in the first embodiment.

At step S33, the control device 4 sets the distraction judgment angle Θ2 to a second angle larger than the first angle. The second angle can, for example, be made an angular degree of an angle formed by the distraction judgment line C and the horizontal line A when making the top end position of the viewing judgment range of inside equipment the top end position of the second range explained above in the first embodiment.

At step S34, the control device 4 judges whether the driver is distracted by the inside equipment, specifically, if the gaze angle Θ1 has been greater than or equal to the distraction judgment angle Θ2 continuously for greater than or equal to a predetermined distraction judgment time. If the gaze angle Θ1 has been greater than or equal to the distraction judgment angle Θ2 continuously for greater than or equal to the predetermined distraction judgment time, the control device 4 judges that the driver is distracted by inside equipment and proceeds to the processing of step S8. On the other hand, if the gaze angle Θ1 has not been greater than or equal to the distraction judgment angle Θ2 continuously for greater than or equal to the predetermined distraction judgment time, the control device 4 ends the current processing.

The control device 4 (distraction judgment device) according to the present embodiment explained above is configured to detect an object present in a front direction of the vehicle 100 (outside front object) based on surrounding data showing the situation around the vehicle 100, detect a gaze origin, gaze direction, and gaze angle of a driver based on driver data showing the state of the driver, change a distraction judgment angle for judging whether the driver is looking at inside equipment arranged inside at the front in accordance with the positional relation with the outside front object, judge that the driver is distracted by inside equipment if the gaze angle of the driver has been greater than or equal to a distraction judgment angle continuously for greater than or equal to a predetermined distraction judgment time, and increase the distraction judgment angle when the object is positioned close by compared to when it is positioned far away. The gaze angle is an angular degree of an angle formed by a horizontal line extending horizontally from a gaze origin of the driver and a gaze direction line extending from the gaze origin of the driver toward the gaze direction lower than the horizontal line, while the distraction judgment angle is an angular degree of an angle formed by the horizontal line and a distraction judgment line extending from the gaze origin of the driver toward the top end position of the inside equipment.

Due to this, when the distance to the outside front object gradually becomes smaller and the gaze direction of the driver turns downward, it becomes difficult for the gaze angle to become greater than or equal to the distraction judgment angle, so in the same way as the first embodiment, it is possible to keep it from being mistakenly judged that the driver is looking at inside equipment regardless of his looking at an outside front object.

Above, embodiments of the present invention were explained, but the above embodiments only show some of the examples of application of the present invention. They are not intended to limit the technical scope of the present invention to the specific constitutions of the embodiments.

For example, in the above embodiments, whether an outside front object is present far away or is present close by was judged in accordance with the distance to the outside front object and the viewing judgment range of the inside equipment was changed accordingly. Specifically, if the distance to the outside front object was greater than or equal to a predetermined threshold value, it was judged that the outside front object was present far away and the viewing judgment range of the inside equipment was set to a first range while if the distance to the outside front object was less than the predetermined threshold value, it was judged that the outside front object was present close by and the viewing judgment range of the inside equipment was set to a second range.

However, the invention is not limited to this. For example, as explained above with reference to FIG. 7A and FIG. 7B, if the driver is looking at an outside front object, the gaze direction turns downward when the outside front object is present close by compared to when it is positioned far away, so the gaze angle Θ1 tends to become larger. Therefore, it is also possible to judge if the outside front object is present far away or is present close by in accordance with the gaze angle Θ1. Specifically, it is also possible to judge that the outside front object is present far away if the gaze angle Θ1 is less than or equal to a predetermined angle and judge that the outside front object is present close by if the gaze angle Θ1 is larger than the predetermined angle.

That is, it is also possible to configure the control device 4 so as to obtain a grasp of the position relationship with an outside front object by detecting a gaze angle Θ1 of the driver, judge that the outside front object is positioned far away if the gaze angle Θ1 is less than or equal to a predetermined angle, and judge that the outside front object is positioned close by if the gaze angle Θ1 is greater than a predetermined angle.

Further, for example, in the above embodiments, the distraction judgment time may be made larger when the outside front object is positioned close by compared to when it is positioned far away. By doing this, it is possible to keep down the sensitivity of the judgment of viewing of inside equipment when the outside front object is positioned close by compared to when it is positioned far away, so it is possible to keep it from being mistakenly judged that the driver is looking at inside equipment regardless of his looking at an outside front object even more.

For example, the computer program run in the control device 4 in the above embodiments (processing for judging distraction by inside equipment) may also be provided in a form recorded in a computer readable portable recording medium such as a semiconductor memory, magnetic recording medium, or optical recording medium.

The invention claimed is:

1. A distraction judgment device configured to judge distraction of a driver of a vehicle, wherein
the distraction judgment device is further configured to:
detect an object present in a front direction of the vehicle based on surrounding data showing a situation around the vehicle;
detect a gaze origin and gaze direction of the driver based on driver data showing a state of the driver;
change an up-down direction viewing judgment range for judging whether the driver is looking at inside equipment arranged inside at the front in accordance with a positional relationship with the object;
judge that the driver is distracted by the inside equipment if the gaze direction of the driver falls within the viewing judgment range continuously for greater than or equal to a predetermined distraction judgment time; and
change the viewing judgment range so that the top end position of the viewing judgment range becomes lower when the object is positioned close by compared to when it is positioned far away.

2. The distraction judgment device according to claim 1, wherein
the top end position of the viewing judgment range is set to any position from a top end position of the inside equipment to a bottom end position of front glass of the vehicle when the object is positioned far away.

3. The distraction judgment device according to claim 2, wherein
the distraction judgment device is further configured not to change the viewing judgment range when a positional relationship with the object shifts from a state where it is positioned far away to a state where it is positioned close by in a period from when the gaze direction of the driver falls within the viewing judgment range to when the distraction judgment time elapses.

4. The distraction judgment device according to claim 2, wherein
the distraction judgment device is further configured to:
obtain a grasp of the positional relationship with the object by detecting a distance to the object;
judge that the object is positioned far away if the distance to the object is greater than or equal to a predetermined threshold value; and
judge that the object is positioned close by if the distance to the object is less than the predetermined threshold value.

5. The distraction judgment device according to claim 2, wherein
the distraction judgment device is further configured to:
obtain a grasp of a positional relationship with the object by detecting a gaze angle of the driver, the gaze angle being an angular degree of an angle formed by a horizontal line extending horizontally from a gaze origin of the driver and a gaze direction line extending from the gaze origin of the driver toward the gaze direction lower than the horizontal line;
judge that the object is positioned far away if that gaze angle is less than or equal to a predetermined angle; and
judge that the object is positioned close by if that gaze angle is greater than the predetermined angle.

6. The distraction judgment device according to claim 2, wherein
the distraction judgment device is further configured to make the distraction judgment time larger when the object is positioned close by compared to when it is positioned far away.

7. The distraction judgment device according to claim 2, wherein
the distraction judgment device is further configured to issue a warning to the driver regarding distraction when judging that the driver is distracted by inside equipment.

8. The distraction judgment device according to claim 1, wherein
the distraction judgment device is further configured not to change the viewing judgment range when a positional relationship with the object shifts from a state where it is positioned far away to a state where it is positioned close by in a period from when the gaze direction of the driver falls within the viewing judgment range to when the distraction judgment time elapses.

9. The distraction judgment device according to claim 1, wherein
the distraction judgment device is further configured to:
obtain a grasp of the positional relationship with the object by detecting a distance to the object;
judge that the object is positioned far away if the distance to the object is greater than or equal to a predetermined threshold value; and
judge that the object is positioned close by if the distance to the object is less than the predetermined threshold value.

10. The distraction judgment device according to claim 1, wherein
the distraction judgment device is further configured to:
obtain a grasp of a positional relationship with the object by detecting a gaze angle of the driver, the gaze angle being an angular degree of an angle formed by a horizontal line extending horizontally from a gaze origin of the driver and a gaze direction line extending from the gaze origin of the driver toward the gaze direction lower than the horizontal line;
judge that the object is positioned far away if that gaze angle is less than or equal to a predetermined angle; and
judge that the object is positioned close by if that gaze angle is greater than the predetermined angle.

11. The distraction judgment device according to claim 1, wherein
the distraction judgment device is further configured to make the distraction judgment time larger when the object is positioned close by compared to when it is positioned far away.

12. The distraction judgment device according to claim 1, wherein the distraction judgment device is further configured to issue a warning to the driver regarding distraction when judging that the driver is distracted by inside equipment.

13. A distraction judgment device configured to judge distraction of a driver of a vehicle, wherein
the distraction judgment device is further configured to:
detect an object present in a front direction of the vehicle based on surrounding data showing a situation around the vehicle;
detect a gaze origin, gaze direction, and gaze angle of the driver based on driver data showing a state of the driver;
change a distraction judgment angle for judging whether the driver is looking at inside equipment arranged inside at the front in accordance with a positional relationship with the object;
judge that the driver is distracted by the inside equipment if a gaze angle of the driver becomes greater than or equal to the distraction judgment angle continuously for greater than or equal to a predetermined distraction judgment time; and
make the distraction judgment angle larger when the object is positioned close by compared to when it is positioned far away, and
the gaze angle is an angular degree of an angle formed by a horizontal line extending horizontally from a gaze origin of the driver and a gaze direction line extending from the gaze origin of the driver toward the gaze direction lower than the horizontal line, and
the distraction judgment angle is an angular degree of the angle formed by the horizontal line and the distraction judgment line extending from the gaze origin of the driver toward the top end position of the inside equipment.

14. A distraction judgment method by a distraction judgment device configured to judge distraction of a driver of a vehicle, wherein
the distraction judgment method comprises:
detecting an object present in a front direction of the vehicle based on surrounding data showing a situation around the vehicle;
detecting a gaze origin and gaze direction of the driver based on driver data showing a state of the driver;
changing an up-down direction viewing judgment range for judging whether the driver is looking at inside equipment arranged inside at the front in accordance with a positional relationship with the object;
judging that the driver is being distracted by inside equipment if the gaze direction of the driver falls within the viewing judgment range continuously for greater than or equal to a predetermined distraction judgment time; and
changing the viewing judgment range so that the top end position of the viewing judgment range becomes lower when the object is positioned close by compared to when it is positioned far away.

15. A nontransitory computer storage medium containing a computer program for a distraction judgment device configured to judge distraction of a driver of a vehicle,
the nontransitory computer storage medium containing a computer program for making the distraction judgment device:
detect an object present in a front direction of the vehicle based on surrounding data showing a situation around that vehicle;
detect a gaze origin and gaze direction of the driver based on driver data showing a state of the driver;
change an up-down direction viewing judgment range for judging whether the driver is looking at inside equipment arranged inside at the front in accordance with a positional relationship with the object;
judge that the driver is being distracted by inside equipment if the gaze direction of the driver falls within the viewing judgment range continuously for greater than or equal to a predetermined distraction judgment time; and
change the viewing judgment range so that the top end position of the viewing judgment range becomes lower when the object is positioned close by compared to when it is positioned far away.

\* \* \* \* \*